(12) United States Patent
Akinbi

(10) Patent No.: US 6,487,280 B1
(45) Date of Patent: Nov. 26, 2002

(54) MULTI-MEDIA DATA ACCESSING AND SENDING SYSTEM

(76) Inventor: Adewole Akinbi, 1031 Plainfield St., Johnston, RI (US) 02919

( * ) Notice: Subject to any disclaimer, the term of this patent is extended or adjusted under 35 U.S.C. 154(b) by 0 days.

(21) Appl. No.: 09/780,003

(22) Filed: Feb. 9, 2001

(51) Int. Cl.⁷ ............................................ H04M 11/00
(52) U.S. Cl. ............................ 379/100.04; 379/100.01; 379/93.24
(58) Field of Search ..................... 379/100.04, 100.01, 379/100.02, 100.03, 90.01, 93.05, 93.12, 93.17, 93.24, 93.25

(56) References Cited

U.S. PATENT DOCUMENTS

| | | | |
|---|---|---|---|
| D339,329 S | 9/1993 | Lacko | |
| 5,272,747 A | 12/1993 | Meads | |
| 5,602,905 A | 2/1997 | Mettke | |
| 5,812,765 A | 9/1998 | Curtis | |
| 5,822,215 A | 10/1998 | Hohmann et al. | |
| 5,898,780 A | 4/1999 | Liu et al. | |
| 6,195,694 B1 * | 2/2001 | Chen et al. ................... | 709/220 |

FOREIGN PATENT DOCUMENTS

| | | | | |
|---|---|---|---|---|
| EP | 0486160 A2 * | 5/1992 | ............. | H04N/1/00 |
| JP | 409172521 A * | 6/1997 | ............. | H04N/1/04 |
| JP | 02000341645 A * | 12/2000 | ............. | H04N/1/00 |

* cited by examiner

*Primary Examiner*—Melur. Ramakrishnaiah

(57) ABSTRACT

A multi-media data accessing and sending system for offering a plurality of data manipulating devices in a central location. The multi-media data accessing and sending system includes a housing having a front side, a back side and a peripheral wall extending between and is integrally coupled to the front and back sides. A processor for processing data is positioned in the housing. A video monitor for displaying input data and output data of the processor is operationally coupled to the processor. A keyboard for inputting data into the processor is positioned in the front side of the housing. The keyboard is operationally coupled to the processor. A facsimile device for faxing information and for making copies is positioned in the housing of sheets of information and is operationally coupled to the processor. An actuator for selecting the facsimile device is positioned on the front side of the housing. The front side of the housing has a first slot therein. A sheet to be copied may be positioned in the first slot for being received by the facsimile device. The front side of the housing has a second slot therein for expelling the sheet of information, copies of the sheet of information and incoming facsimile transmittals. The system is coupled to a telephone line for accessing information from the internet.

7 Claims, 3 Drawing Sheets

MULTI-MEDIA DATA ACCESSING AND SENDING SYSTEM

BACKGROUND OF THE INVENTION

1. Field of the Invention

The present invention relates to multi-media data accessing and sending systems and more particularly pertains to a new multi-media data accessing and sending system for offering a plurality of data manipulating devices in a central location.

2. Description of the Prior Art

The use of multi-media data accessing and sending systems is known in the prior art. More specifically, multi-media data accessing and sending systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,812,765; 5,822,215; 5,602,905; 5,898,780; 5,272,747; U.S. Des. Pat. No. 339,329.

While these devices fulfill their respective, particular objectives and requirements, the aforementioned patents do not disclose a new multi-media data accessing and sending system. The inventive device includes a housing having a front side, a back side and a peripheral wall extending between and is integrally coupled to the front and back sides. A processor for processing data is positioned in the housing. A video monitor for displaying input data and output data of the processor is operationally coupled to the processor. A keyboard for inputting data into the processor is positioned in the front side of the housing. The keyboard is operationally coupled to the processor. A facsimile device for faxing information and for making copies is positioned in the housing of sheets of information and is operationally coupled to the processor. An actuator for selecting the facsimile device is positioned on the front side of the housing. The front side of the housing has a first slot therein. A sheet to be copied may be positioned in the first slot for being received by the facsimile device. The front side of the housing has a second slot therein for expelling the sheet of information, copies of the sheet of information and incoming facsimile transmittals. The system is coupled to a telephone line for accessing information from the internet.

In these respects, the multi-media data accessing and sending system according to the present invention substantially departs from the conventional concepts and designs of the prior art, and in so doing provides an apparatus primarily developed for the purpose of offering a plurality of data manipulating devices in a central location.

SUMMARY OF THE INVENTION

In view of the foregoing disadvantages inherent in the known types of multi-media data accessing and sending systems now present in the prior art, the present invention provides a new multi-media data accessing and sending system construction wherein the same can be utilized for offering a plurality of data manipulating devices in a central location.

The general purpose of the present invention, which will be described subsequently in greater detail, is to provide a new multi-media data accessing and sending system apparatus and method which has many of the advantages of the multi-media data accessing and sending systems mentioned heretofore and many novel features that result in a new multi-media data accessing and sending system which is not anticipated, rendered obvious, suggested, or even implied by any of the prior art multi-media data accessing and sending systems, either alone or in any combination thereof.

To attain this, the present invention generally comprises a housing having a front side, a back side and a peripheral wall extending between and is integrally coupled to the front and back sides. A processor for processing data is positioned in the housing. A video monitor for displaying input data and output data of the processor is operationally coupled to the processor. A keyboard for inputting data into the processor is positioned in the front side of the housing. The keyboard is operationally coupled to the processor. A facsimile device for faxing information and for making copies is positioned in the housing of sheets of information and is operationally coupled to the processor. An actuator for selecting the facsimile device is positioned on the front side of the housing. The front side of the housing has a first slot therein. A sheet to be copied may be positioned in the first slot for being received by the facsimile device. The front side of the housing has a second slot therein for expelling the sheet of information, copies of the sheet of information and incoming facsimile transmittals. The system is coupled to a telephone line for accessing information from the internet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-media data accessing and sending system apparatus and method which has many of the advantages of the multi-media data accessing and sending systems mentioned heretofore and many novel features that result in a new multi-media data accessing and sending system which is not anticipated, rendered obvious, suggested, or even implied by any of the prior art multi-media data accessing and sending systems, either alone or in any combination thereof.

It is another object of the present invention to provide a new multi-media data accessing and sending system which may be easily and efficiently manufactured and marketed.

It is a further object of the present invention to provide a new multi-media data accessing and sending system which is of a durable and reliable construction.

An even further object of the present invention is to provide a new multi-media data accessing and sending system which is susceptible of a low cost of manufacture with regard to both materials and labor, and which accordingly is then susceptible of low prices of sale to the consuming public, thereby making such multi-media data accessing and sending system economically available to the buying public.

Still yet another object of the present invention is to provide a new multi-media data accessing and sending system which provides in the apparatuses and methods of the prior art some of the advantages thereof, while simultaneously overcoming some of the disadvantages normally associated therewith.

Still another object of the present invention is to provide a new multi-media data accessing and sending system for offering a plurality of data manipulating devices in a central location.

Yet another object of the present invention is to provide a new multi-media data accessing and sending system which includes a housing having a front side, a back side and a peripheral wall extending between and is integrally coupled to the front and back sides. A processor for processing data is positioned in the housing. A video monitor for displaying input data and output data of the processor is operationally coupled to the processor. A keyboard for inputting data into the processor is positioned in the front side of the housing. The keyboard is operationally coupled to the processor. A facsimile device for faxing information and for making copies is positioned in the housing of sheets of information and is operationally coupled to the processor. An actuator for selecting the facsimile device is positioned on the front side of the housing. The front side of the housing has a first slot therein. A sheet to be copied may be positioned in the first slot for being received by the facsimile device. The front side of the housing has a second slot therein for expelling the sheet of information, copies of the sheet of information and incoming facsimile transmittals. The system is coupled to a telephone line for accessing information from the internet.

Still yet another object of the present invention is to provide a new multi-media data accessing and sending system that allows a person in an airport to access the internet, receive and send faxes, make copies, and make telephone calls from one unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
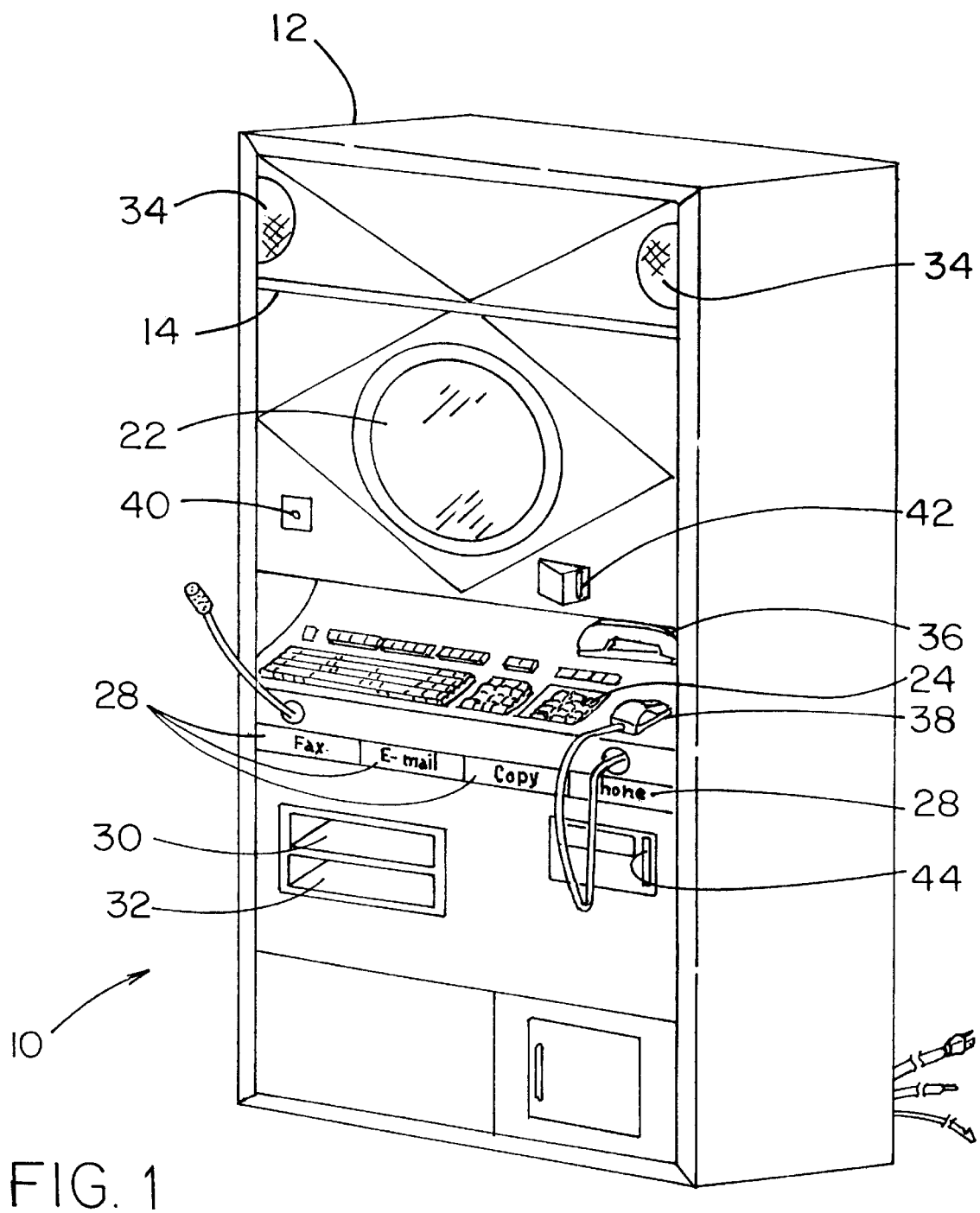
FIG. 1 is a schematic perspective view of a new multi-media data accessing and sending system according to the present invention.
Figure 2:
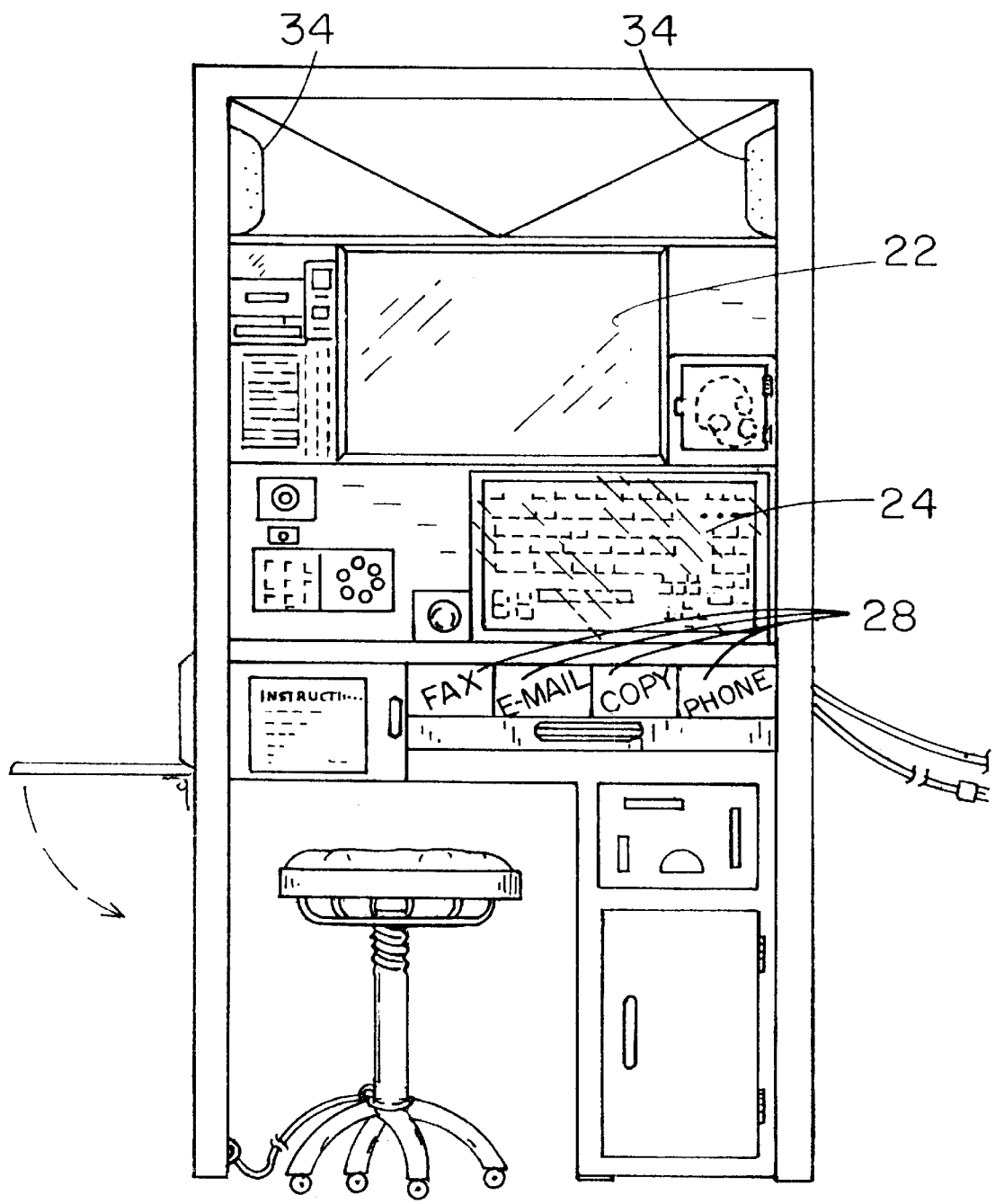
FIG. 2 is a schematic front view of an alternative arrangement of devices of the present invention.
Figure 3:
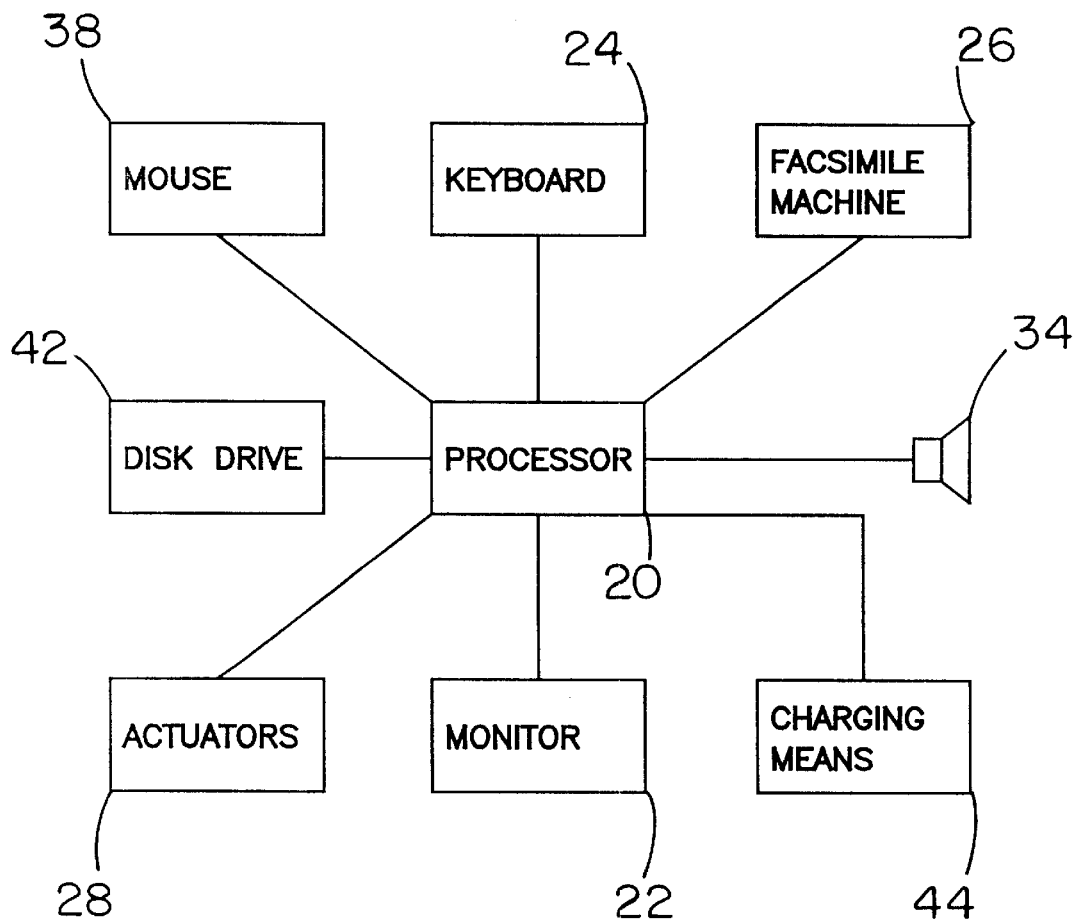
FIG. 3 is an electronic schematic view of the present invention.

With reference now to the drawings, and in particular to FIGS. 1 through 3 thereof, a new multi-media data accessing and sending system embodying the principles and concepts of the present invention and generally designated by the reference numeral will be described.

As best illustrated in FIGS. 1 through 3, the multi-media data accessing and sending system generally comprises a housing 12 having a front side 14, a back side and a peripheral wall extending between and integrally coupled to the front and back sides.

A processor for processing data is positioned in the housing 12. The processor is a conventional computing apparatus.

A video monitor 22 for displaying input data and output data of the processor is operationally coupled to the processor 20. The video monitor 22 is positioned in the front side 14 of the housing 12 and is preferably flush with the front side.

A keyboard 24 for inputting data into the processor is positioned in the front side 14 of the housing 12. The keyboard 24 is operationally coupled to the processor 20.

A conventional facsimile device 26 for faxing information across a telephone line and for making copies of sheets of information is positioned in the housing 12. The facsimile device 26 is operationally coupled to the processor. A plurality of actuators 28 are used for entering options into the computer. One of the actuators selecting the facsimile device 26 is positioned on the front side 14 of the housing 12 below the keyboard 24 and is operationally coupled to the processor 20, and an actuator 28 for causing the facsimile device 26 to copy a sheet of information is positioned on the front side of the housing and is operationally coupled to the processor 20.

An actuator 28 for causing the processor to send email is positioned on the housing 12 and is operationally coupled to the processor 20.

The front side 14 of the housing has a first slot therein. A sheet to be copied may be positioned in the first slot for being received by the facsimile device 26. The front side 14 of the housing has a second slot 32 therein for expelling the sheet of information, copies of the sheet of information and incoming facsimile transmittals.

Each of a pair of speakers 34 for emitting a sound is mounted on the housing 12 and is operationally coupled to the processor 20.

A telephone 36 is operationally coupled to the processor 20 and positioned generally adjacent to the keyboard 24.

A peripheral input device 38 comprising a mouse is operationally coupled to the processor and positioned adjacent to the keyboard 24.

A computer link port 40 adapted for receiving a conduit is operationally coupled to the processor in the housing. The port 40 serves for as connection for lap computers and the like.

Ideally, the device also includes a floppy drive 42 for receiving computer disks. The floppy drive 42 being operationally coupled to the processor 20.

A means for charging a user 44 of the system is positioned in the front side of the housing 12 and is operationally coupled to the processor 20. The means for charging is adapted for reading magnetized strips such as found on credit and debit cards.

In use, the system is coupled to a telephone line for accessing information from the internet. The processor receives input such from the actuators so that the processor may then offer choices for email, faxes, copying or telephone calls. The means for charging a user takes credit information for the processor to send via the phone line to credit providers for billing the user depending on type and length of usage. All devices in the system are conventional items which are positioned together for convenience in areas such as airports.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multi-media data accessing and sending system comprising:
   a housing, said housing having a front side, a back side and a peripheral wall extending between and being integrally coupled to said front and back sides;
   a processor for processing data being positioned in said housing;
   a video monitor for displaying input data and output data of said processor, said video monitor being operationally coupled to said processor;
   a keyboard for inputting data into said processor being positioned in said front side of said housing, said keyboard being operationally coupled to said processor;
   a facsimile device for faxing information across a telephone line being positioned in said housing and for making copies of sheets of information, said facsimile device being operationally coupled to said processor, an actuator for selecting said facsimile device being positioned on said front side of said housing;
   said front side of said housing having a first slot therein, wherein a sheet to be copied may be positioned in said first slot for being received by said facsimile device, said front side of said housing having a second slot therein for expelling said sheet of information, copies of said sheet of information and incoming facsimile transmittals;
   wherein said system is coupled to a telephone line for accessing information from the internet; and
   an actuator for causing said processor to send email being positioned on said housing and being operationally coupled to said processor.

2. The multi-media data accessing and sending system as in claim 1, further including:
   an actuator for causing said facsimile device to copy a sheet of information being positioned on said front side of said housing and being operationally coupled to said processor.

3. The multi-media data accessing and sending system as in claim 1, further including:
   a pair of speakers for emitting a sound being mounted on said housing and being operationally coupled to said processor.

4. The multi-media data accessing and sending system as in claim 1, further including:
   a telephone being operationally coupled to said processor and positioned generally adjacent to said keyboard.

5. The multi-media data accessing and sending system as in claim 1, further including:
   a peripheral input device comprising a mouse being operationally coupled to said processor.

6. The multi-media data accessing and sending system as in claim 1, further including:
   a means for charging a user of said system being positioned in said front side of said housing and being operationally coupled to said processor, said means for charging being adapted for reading magnetized strips.

7. A multi-media data accessing and sending system comprising:
   a housing, said housing having a front side, a back side and a peripheral wall extending between and being integrally coupled to said front and back sides;
   a processor for processing data being positioned in said housing;
   a video monitor for displaying input data and output data of said processor, said video monitor being operationally coupled to said processor, said video monitor being positioned in said front side of said housing and being generally flush with said front side;
   a keyboard for inputting data into said processor being positioned in said front side of said housing, said keyboard being operationally coupled to said processor;
   a facsimile device for faxing information across a telephone line being positioned in said housing and for making copies of sheets of information, said facsimile device being operationally coupled to said processor, an actuator for selecting said facsimile device being positioned on said front side of said housing below said keyboard and being operationally coupled to said processor, an actuator for causing said facsimile device to copy a sheet of information being positioned on said front side of said housing and being operationally coupled to said processor;
   an actuator for causing said processor to send email being positioned on said housing and being operationally coupled to said processor;
   said front side of said housing having a first slot therein, wherein a sheet to be copied may be positioned in said first slot for being received by said facsimile device, said front side of said housing having a second slot therein for expelling said sheet of information, copies of said sheet of information and incoming facsimile transmittals;

a pair of speakers for emitting a sound being mounted on said housing and being operationally coupled to said processor;

a telephone being operationally coupled to said processor and positioned generally adjacent to said keyboard;

a peripheral input device comprising a mouse being operationally coupled to said processor;

a computer link port adapted for receiving a conduit being operationally coupled to said processor in said housing;

a means for charging a user of said system being positioned in said front side of said housing and being operationally coupled to said processor, said means for charging being adapted for reading magnetized strips; and wherein said system is coupled to a telephone line for accessing information from the internet.

* * * * *